United States Patent Office 3,769,291
Patented Oct. 30, 1973

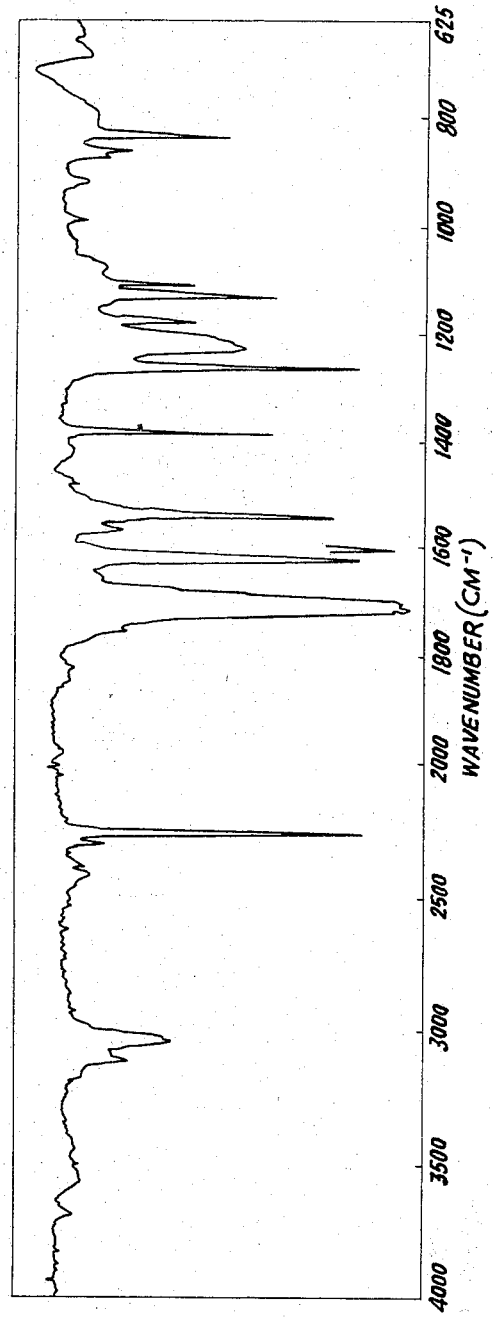

3,769,291
2-OXO-1(2H)-PYRIDINECARBONITRILE AND SUBSTITUTED DERIVATIVES THEREOF
William Lawrence Parker, North Brunswick, and Saul Lewis Neidleman, Trenton, N.J., assignors to E. R. Squibb & Sons, Inc., New York, N.Y.
Continuation-in-part of abandoned application Ser. No. 111,125, Jan. 29, 1971. This application May 28, 1971, Ser. No. 148,037
Int. Cl. C07d 31/42
U.S. Cl. 260—296 R                     5 Claims

ABSTRACT OF THE DISCLOSURE 2-oxo-1(2H)-pyridinecarbonitrile and derivatives thereof have anticandidal activity. They may also be reacted with a nucleophile to form a 2-pyridone and a cyanated nucleophile.

RELATED APPLICATION

This application is a continuation-in-part of copending application Ser. No. 111,125 filed Jan. 29, 1971, now abandoned.

BACKGROUND OF THE INVENTION

Candida, a genus of yeast-like microorganisms, is responsible for various pathogenic conditions in humans. Candida albicans, for example, is responsible for thrush and other types of moniliasis.

2-pyridone and substituted 2-pyridones are useful intermediates for various compounds, e.g. 2-chloropyridines.

Various cyanamides are useful herbicides and are useful intermediates for carbamates and guanidines.

OBJECTS OF THE INVENTION

It is an object of the present invention to provide compounds having anticandidal activity. Another object is to provide methods for the production of these compounds. A further object is to provide a method for the preparation of 2-pyridones and of cyanides. These and other objects of the present invention will be apparent from the following description.

SUMMARY OF THE INVENTION

Compounds of the formula

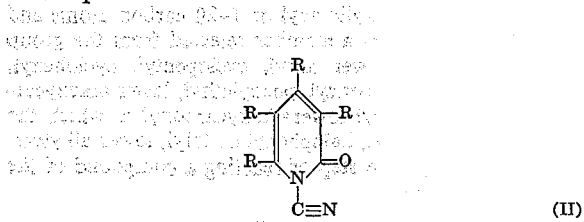

wherein each R may be the same or different and may be hydrogen, lower alkyl or lower alkenyl of up to 12 carbon atoms, hydroxyl, lower alkoxy of up to 12 carbon atoms, nitro, cyano, halogen, carboxy, amido, mercapto, aliphatic or aromatic acyl radicals of up to 20 carbon atoms, a phenyl radical substituted by one of the foregoing substituents, phenyl or aryloxy of up to 10 carbon atoms, and wherein any adjacent R groups taken together may be a phenyl ring, have been found to have anticandidal activity. These compounds may be prepared by reacting 2-acetoacetamido-pyridine or a derivative thereof with an alkali metal nitrite at an acidic pH, or by reacting a salt of 2(1H)-pyridone, or a derivative thereof, with a cyanogen halide. The reaction of a compound of the invention with a nucleophile yields a 2-pyridone and a cyanide.

DETAILED DESCRIPTION

The compounds of the present invention may be prepared according to the following reaction sequence:

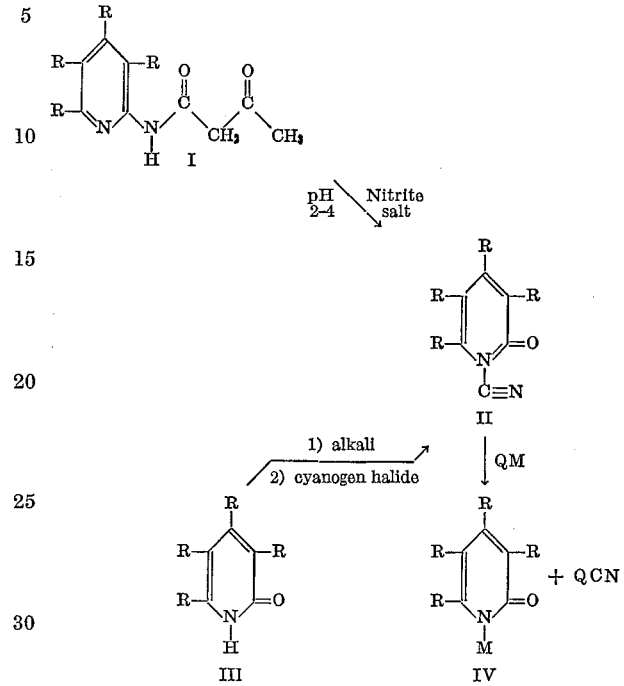

An acetoacetamidopyridine compound of Formula I is reacted with a nitrite salt at an acidic pH to form a 2-oxo-1(2H)-pyridinecarbonitrile compound of Formula II. The nitrite salt may be a water-soluble alkali metal nitrite, e.g., $LiNO_2$, $NaNO_2$, $KNO_2$, or a water-soluble alkaline earth metal nitrite, e.g., $Ca(NO_2)_2$. The reaction takes place in aqueous medium at lowered temperatures, preferably at temperatures below about 10° C., and most preferably at about 0° C. The compound of Formula II is extracted from the aqueous medium by means of a water-immiscible organic solvent, such as an ester, e.g., ethyl acetate; an ether, e.g. ethyl ether; a halogenated alkane, e.g., chloroform; or an aromatic solvent, e.g., benzene, toluene or xylene.

The compound of Formula II may also be prepared by reacting an alkali metal salt of a 2-pyridone compound of Formula III with a cyanogen halide. This reaction takes place in a polar solvent at lowered temperatures. Suitable solvents are amides, e.g. dimethylformamide or dimethylacetamide; or ethers, e.g. bis(2-methoxyethyl)ether. Suitable temperatures are from about −10° C. to about 10° C., preferably at about 0° C.

The alkali metal salt of the 2-pyridone compound of Formula III may be obtained by reacting a compound of Formula III with an alkali metal hydroxide, e.g. LiOH, NaOH, or KOH; an alkali metal hydride, e.g. LiH, NaH, or KH; an alkali metal amide, e.g. $LiNH_2$, $NaNH_2$, or $KNH_2$; or an alkyl organo-alkali metal compound, e.g. Li-butyl, Na-butyl or K-butyl.

The cyanogen halide employed to convert the alkali metal salt of the compound of Formula III to the corresponding compound of Formula II is preferably cyanogen bromide or cyanogen chloride.

The compounds of Formula II may be reacted with a nucleophilic compound. The nucleophilic compound may be any compound from which an anion may be generated, usually by means of a strong base. As typical nucleophilic compounds there may be mentioned alcohol, thiols, amines, ammonia, phenols, thiophenols, Grignard reagents and malonic esters. Thus, the nucleophilic compound may have the formula QM wherein Q may be alkyl, alkoxy, thioalkyl, aryl, aryloxy, arylthio, amino, monoalkylamino, dialkylamino, monoarylamino, diarylamino, or a basic nitrogen containing heterocyclic radical attached to M through the nitrogen atom, and wherein M may be H, alkali metal, alkaline earth metal, Tl, divalent Cd, MgBr, MgQ or CaQ. Reaction of a compound of Formula II with a nucleophile of formula QM forms a 2-pyridone of Formula IV and, correspondingly, a cyanide of formula QCN. When the nucleophile is ammonia, the cyanated product is cyanamide.

Specific examples of such nucleophiles are following:

(I) Alcohols containing from 1 to 20 carbon atoms.

(A) Primary alcohols such as alkanols, cycloalkanols, and aryl-substituted alkanols, e.g., methanol, ethanol, n-propanol, n-butanol, n-pentanol, n-hexanol, n-heptanol, n-octanol, n-nonanol, n-decanol, n-dodecanol, n-tetradecanol, n-hexadecanol, n-octadecanol, 2-methyl-1-propanol, isoamylalcohol, 2-methyl-1-butanol, benzyl alcohol, cyclohexylcarbinol, ethylene glycol and trimethylene glycol.

(B) Secondary alcohols, such as alkanols, cycloalkanols and aryl-substituted alkanols, e.g., 2-propanol, 2-methyl-2-propanol, 3-methyl-2-butanol, 2-pentanol, 3-pentanol, 3-hexanol, benzhydrol, cyclohexanol and dicyclohexylcarbinol.

(C) Tertiary alcohols, such as alkanols, cycloalkanols and aryl-substituted alkanols, e.g., t-butanol, t-amyl alcohol, 2,3-dimethyl-2-butanol, triphenylcarbinol and tricyclohexylcarbinol.

(D) Mixed alcohols having primary and secondary alcohol groups, e.g., propylene glycol, glycerol, β-methylglycerol, glucose, fructose, apiose, mannose, mannitol, galactose and acrose.

(II) Thiols containing from 1 to 20 carbon atoms corresponding to the foregoing alcohols. The thiols, or mercaptans, are prepared conveniently by heating alkyl halides with sodium hydrosulfide.

(III) Ammonia and organic amines containing from 1 to 20 carbon atoms, and alkali and alkaline earth metal derivatives thereof.

(A) Primary alkylamines, cycloalkylamines, aryl-substituted alkylamines, and aromatic amines, e.g., methylamine, ethylamine, n-propylamine, isopropylamine, n-butylamine, isobutylamine, t-butylamine, n-amylamine, n-hexylamine, n-octylamine, 2-aminooctane, 2-ethyl-1-aminohexane, n-decylamine, laurylamine, cyclohexylamine, benzylamine, α-phenylethylamine, β-phenylethylamine, aniline, and aminopyridine.

(B) Secondary amines such as dialkylamines, aryl-substituted alkylamines, dicyclohexylamines and diarylamines, and N-heterocyclic amines, e.g., dimethylamine, diethylamine, di - n - propylamine, diisopropylamine, ethyl-sec-butylamine, diphenylamine, benzylaniline, N-methylaniline, N-ethylaniline, N-phenylbenzylamine, N-methylbenzylamine, diphenylamine, dicyclohexylamine, morpholine, piperidine, pyrrolidine, pyrrole, pyrrolidine, pyrazole, imidazole, benzopyrrole, skatole, 2-methylindole, 2-phenylindole, 1,2,3,4-tetrahydroquinoline, decahydroquinoline and carbazole.

(IV) Phenols such as phenol and substituted phenols containing from 6 to 12 carbon atoms, such as o-cresol, m-cresol, p-cresol, o-chlorophenol, m-chlorophenol, p-chlorophenol, p-bromophenol, 2,4,6-trichlorophenol, 2,4,6-trifluorophenol, o-nitrophenol, m-nitrophenol, p-nitrophenol, 2,4-dinitrophenol, guaiacol, saligenin, carvacrol, thymol, o-hydroxydiphenyl, p-hydroxydiphenyl, o-cyclohexylphenol, p-cyclohexylphenol, catechol, resorcinol, hydroquinone, pyrogallol and phloroglucinol.

(V) Thiophenols include thiophenol and substituted thiophenols containing from 6 to 12 carbon atoms corresponding to the foregoing phenols.

(VI) Grignard reagents of the formula RMgX wherein R is an organic radical which forms a Grignard reagent and X is halogen, e.g., R may be alkyl, cycloalkyl, aryl, substituted alkyl, substituted cycloalkyl or substituted aryl.

(VII) Malonic esters, e.g., $Na^+[CH(COOC_2H_5)_2]^-$.

(VIII) Organometallic compounds wherein the organic radical may be alkyl or aryl and the metal may be an alkali metal or an alkaline earth metal or divalent Cd, e.g., butyl Li, phenyl Li, ethyl Na, amyl Na, octyl Na, diphenyl Mg, diethyl Mg, diethyl Ca, and dioctyl Cd.

The reaction between the compound of Formula II and the nucleophile of formula QM takes place in the presence of easily volatilized inert solvents, that is, solvents which have a boiling point not over about 100° C. at atmospheric pressure. The choice of solvents depends essentially upon the solubilities of the reactants. The reaction may take place at temperatures in the range of about 0° C. to about the boiling point of the solvent, preferably at about room temperature. As examples of suitable solvents, there may be mentioned ethers, e.g., ethyl ether or dioxane, aromatic solvents, e.g., benzene, toluene or xylene, halogenated solvents, e.g., chloroform and methylene chloride, ketones, e.g., acetone and methyl ethyl ketone, and aliphatic solvents, e.g., hexane and heptane, as well as mixtures of any of the foregoing solvents.

The compounds of Formula II have anticandidal activity as demonstrated by paper disc-agar diffusion assay.

The following examples illustrate the present invention without, however, limiting the same thereto.

Example 1

Sodium nitrile, 2 g., and 2-acetoacetamidopyridine, 1 g., are mixed with 200 ml. of water. The mixture is then adjusted to pH 3.0 with acetic acid and cooled on ice. After 2 hours at 0° C., the solution is extracted with ethyl acetate and the extract dried ($Na_2SO_4$) and concentrated in vacuo. The active material is isolated by chromatography on silica gel using chloroform-methanol (49:1). Sublimation at 90° C. and 0.02 mm. followed by recrystallization from benzene-cyclohexane (4:1) gives 20 mg. of 2-oxo-1(2H)-pyridinecarbonitrile, M.P. 100.5–101.5° C. The infrared spectrum in chloroform is shown in FIG. 1. The following absorption bands in reciprocal centimeters are observed:

| 2259 | 1539 | 1135 |
| 1713 | 1384 | 1115 |
| 1701 | 1266 | 869 |
| 1619 | 1180 | 839 |

The ultraviolet spectrum in cyclohexane has maxima or shoulders (sh.) at the following wavelengths (nm.):

| sh 219 | (ε 2100) | sh 292 | (4000) | 323 | (3900) |
| sh 223 | (1800) | sh 297 | (4400) | 327 | (3500) |
| sh 228 | (1500) | 303 | (4900) | 339 | (1500) |
| sh 233 | (920) | 309 | (5000) | 346 | (1300) |
| sh 239.5 | (300) | 314 | (5100) | | |

Analysis.—Calcd. for $C_6H_4N_2O$ (percent): C, 60.00; H, 3.36; N, 23.33. Found (percent): C, 59.89; H, 3.41; N, 23.14.

The material is very soluble in chloroform and in ethyl acetate and is moderately soluble in benzene. It has little solubility in carbon tetrachloride and in hexane. The nuclear magnetic resonance spectrum in deuterochloroform has complex multiplets at 6.0–6.8 p.p.m. (2 protons) and at 7.2–7.7 p.p.m. (2 protons) and no other absorption. Activity against Candida albicans SC5314 and Candida tropicalis ATCC 13803 is demonstrated by paper disc-agar diffusion assay.

Example 2

A solution of 2(1H-pyridone in one equivalent of 2 N aqueous sodium hydroxide is taken to dryness in vacuo and the residue is recrystallized from 95% ethanol, giving nacreous platelets of the hydrated sodium salt of 2(1H)-pyridone. A solution of the salt (10.8 g.) in 260 ml. of dimethylformamide (DMF) is added to a stirred solution of 13.0 g. of cyanogen bromide in 10 ml. of DMF at 0° over a period of 1.5 hours. After stirring for an additional 10 minutes at 0°, the DMF is removed in vacuo. The residue (dark brown) is dissolved as much as possible in chloroform, filtered, and the filtrate taken to dryness in vacuo. This residue is then dissolved in ethyl acetate and the solution is passed through a column of silica gel (300 g.) to remove the bulk of the colored impurities. Removal of the solvent gives 7.65 g. of solid that is then sublimed at 90–110° C. and 0.02 mm. Recrystallization of the sublimate (5.67 g.) from benzene-cyclohexane (4:1) gives 4.24 g. of pure 2-oxo-1(2H)-pyridinecarbonitrile, M.P. 100.5–101.5° C. Activity against Candida species is demonstrated as in Example 1.

Example 3

Diethylamine (4.0 g.) is added to a stirred solution of 6 g. of 2-oxo-1(2H)-pyridinecarbonitrile in 60 ml. of chloroform at room temperature. The solution is stirred at room temperature for 0.5 hour and then the solvent is removed by distillation. After removal of the solvent, diethylcyanamide is isolated by distillation at 10 torr. 2-pyridone is recovered from the residue by crystallization.

Examples 4–35

Following the procedure of Example 2 but substituting for 2(1H)-pyridone the following substituted 2-pyridones, there is obtained the following correspondingly substituted 2-oxo-1(2H)-pyridinecarbonitriles. The substituents $R_1$, $R_2$, $R_3$ and $R_4$ in both the starting pyridone and the final pyridinecarbonitrile are as indicated in the following table:

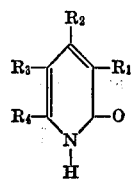  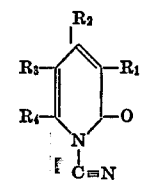

| Example | $R_1$ | $R_2$ | $R_3$ | $R_4$ |
| --- | --- | --- | --- | --- |
| 4 | Cl | H | H | H |
| 5 | Br | H | H | H |
| 6 | CH₃ | H | H | H |
| 7 | H | CH₃ | H | H |
| 8 | H | H | CH₃ | H |
| 9 | H | H | H | CH₃ |
| 10 | OH | H | H | H |
| 11 | H | H | H | OH |
| 12 | H | H | Cl | H |
| 13 | Cl | H | Cl | H |
| 14 | H | H | Br | H |
| 15 | Br | H | Br | H |
| 16 | H | H | I | H |
| 17 | I | H | H | H |
| 18 | NO₂ | H | H | H |
| 19 | H | H | NO₂ | H |
| 20 | H | CH₃C(O)− | H | H |
| 21 | H | CH₂=CHCH₂ | H | H |
| 22 | CN | H | H | H |
| 23 | NO₂ | H | NO₂ | H |
| 24 | H | CH₃CH₂O− | H | H |
| 25 | H | OH | H | H |
| 26 | H | H | C₆H₅ | CH₃ |
| 27 | COOH | H | H | H |
| 28 | CONH₂ | H | H | H |
| 29 | H | SH | H | H |
| 30 | H | C₆H₅ | C₆H₅−O− | C₆H₅ |
| 31 | H | CH₃O−C₆H₂(OCH₃)(OCH₃)− | H | CH₃ |
| 32 | H | C₆H₅ | Cl−C₆H₄−O− | C₆H₅ |
| 33 | H | NO₂−C₆H₄ | H | H |
| 34 | Cl | Cl | Cl | Cl |
| 35 | H | C₆H₅ | CH₃−C₆H₃−O− | C₆H₅ |

Examples 36–43

Following the procedure of Example 2 but substituting for 2(1H)-pyridone the following substituted 2-pyridones, there is obtained the following correspondingly substituted 2-oxo-1(2H)-pyridinecarbonitriles. The substituents in the $R_3$ and $R_4$ positions in the starting pyridone (the carbon atom para to the carbon containing the $R_1$ substituent and the carbon atom para to the carbon atom containing the oxo substituent) together form a phenyl ring whose carbons may have substituents $R_5$, $R_6$, $R_7$ and $R_8$. The substituents $R_1$, $R_2$, $R_5$, $R_6$, $R_7$ and $R_8$ in both the starting pyridone and the final pyridinecarbonitrile are as indicated in Table I.

there is obtained the following correspondingly substituted 2-oxo-1(2H)-pyridinecarbonitriles. The substituents in the $R_1$ and $R_2$ positions in the starting pyridone (the carbon atom para to the nitrogen atom and the carbon atom para to the carbon atom containing the $R_4$ substituent) together form a phenyl ring whose carbons may have substituents $R_9$, $R_{10}$, $R_{11}$ and $R_{12}$. The substituents

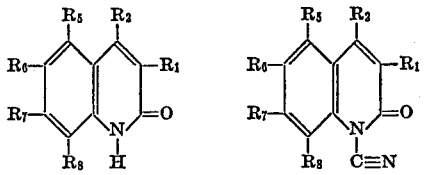

TABLE I

| Example | $R_1$ | $R_2$ | $R_5$ | $R_6$ | $R_7$ | $R_8$ |
|---|---|---|---|---|---|---|
| 36 | H | H | H | H | H | H |
| 37 | CH$_3$CONH— | C$_6$H$_5$— | H | Cl | H | H |
| 38 | H | CH$_3$C(=O)— | H | H | H | H |
| 39 | CH$_3$C(=O)— | OH | H | H | H | H |
| 40 | H | CH$_3$C(=O)— | H | CH$_3$O— | H | H |
| 41 | H | H | H | NO$_2$ | H | H |
| 42 | Cl | H | H | H | H | H |
| 43 | H | H | H | Br | H | CH$_3$CH$_2$— |

Examples 44–58

Following the procedure of Example 2 but substituting for 2(1H)-pyridone the following substituted 2-pyridones, $R_3$, $R_4$, $R_9$, $R_{10}$, $R_{11}$ and $R_{12}$ in both the starting pyridone and the final pyridinecarbonitrile are as indicated in Table II.

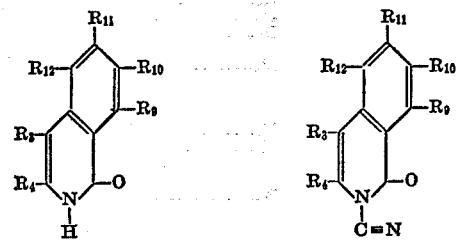

TABLE II

| Example | $R_3$ | $R_4$ | $R_9$ | $R_{10}$ | $R_{11}$ | $R_{12}$ |
|---|---|---|---|---|---|---|
| 44 | H | CH$_3$ | H | H | H | H |
| 45 | H | H | H | H | H | NO$_2$ |
| 46 | OH | CH$_3$O—C$_6$H$_4$—C(=O)— | H | H | H | H |
| 47 | Br | H | H | H | H | H |
| 48 | OH | Br—C$_6$H$_4$—C(=O)— | H | H | H | H |
| 49 | H | C$_4$H$_9$— | H | H | H | H |
| 50 | CH$_3$CH$_2$O— | H | H | H | H | H |
| 51 | OH | H | H | H | H | H |
| 52 | H | H | OH | CH$_3$O— | H | H |
| 53 | CH$_3$ | H | H | CH$_3$O— | H | H |
| 54 | H | H | H | H | H | NO$_2$ |
| 55 | C$_6$H$_5$— | H | H | H | H | H |
| 56 | H | C$_6$H$_5$— | H | H | H | H |
| 57 | H | H | H | H | NO$_2$ | H |
| 58 | H | H | H | H | H | H |

Examples 59-60

Following the procedure of Example 2 but substituting for 2(1H)-pyridone the following substituted 2-pyridones, there is obtained the following correspondingly substituted 2-oxo-1(2H)-pyridinecarbonitriles. The substituents in the $R_2$ and $R_3$ positions in the starting pyridone (the carbon atom para to the nitrogen atom and the carbon atom para to the carbon atom containing the oxo-substituent) together form a phenyl ring whose carbon atoms may have substituents $R_{13}$, $R_{14}$, $R_{15}$ and $R_{16}$. The substituents $R_1$, $R_4$, $R_{13}$, $R_{14}$, $R_{15}$ and $R_{16}$ in both the starting pyridone and the final pyridinecarbonitrile are as indicated in Table III.

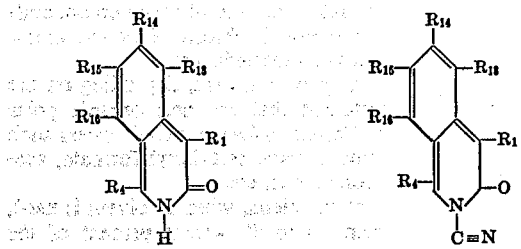

TABLE III

| Example | $R_1$ | $R_4$ | $R_{13}$ | $R_{14}$ | $R_{15}$ | $R_{16}$ |
|---|---|---|---|---|---|---|
| 59 | H | Br | H | H | H | H |
| 60 | 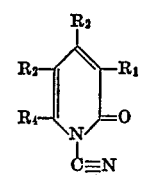 | H | H | H | H | H |
| 61 | H | H | H | H | H | H |

Examples 62-80

Following the procedure of Example 3 but substituting for the diethylamine in that example an equivalent amount of the nucleophile listed in Column I, there is obtained the cyanide indicated in Column II:

| Example | I | II |
|---|---|---|
| 62 | Piperidine | ⬡N—CN |
| 63 | Pyrrolidine | ⬠N—CN |
| 64 | Thiophenol | C₆H₅—S—CN |
| 65 | Sodium phenoxide | C₆H₅—O—CN |
| 66 | Aniline | C₆H₅—NH—CN |
| 67 | n-Pentylamine | $C_5H_{11}$—NH—CN |
| 68 | Phenylmagnesium bromide | C₆H₅—CN |
| 69 | Ethyl MgBr | $C_2H_5$—CN |
| 70 | K-t-butoxide | $(CH_3)_3C$—O—CN |
| 71 | Ammonia | $H_2N$—CN |
| 72 | Methyl mercaptan | $CH_3S$—CN |
| 73 | Diphenylamino | $(C_6H_5)_2$N—CN |
| 74 | Morpholine | morpholine-N—CN |
| 75 | Sodium ethoxide | $C_2H_5OCN$ |
| 76 | Sodium diethylmalonate | $NH$-$CH(CO_2C_2H_5)_2$ |
| 77 | $Mg(C_2H_5)_2$ | $C_2H_5$—CN |
| 78 | $Ca(C_2H_5)_2$ | $C_2H_5$—CN |
| 79 | $TlOC_2H_5$ | $C_2H_5OCN$ |
| 80 | n-Butyl mercaptan | $C_4H_9S$—CN |

What is claimed is:
1. A compound of the structural formula

$$\begin{array}{c}R_2\\R_3\text{—}\bigcirc\text{—}R_1\\R_4\text{—N—}C{=}O\\|\\C{\equiv}N\end{array}$$

wherein for each compound of the foregoing structural formula $R_1$, $R_2$, $R_3$ and $R_4$ have the values indicated in the following table:

| $R_1$ | $R_2$ | $R_3$ | $R_4$ |
|---|---|---|---|
| H | H | H | H |
| Cl | H | H | H |
| Br | H | H | H |
| $CH_3$ | H | H | H |
| H | $CH_3$ | H | H |
| H | H | $CH_3$ | H |
| H | H | H | $CH_3$ |
| OH | H | H | H |
| H | H | H | OH |
| H | H | Cl | H |
| Cl | H | Cl | H |
| H | H | Br | H |
| Br | H | Br | H |
| H | H | I | H |
| I | H | H | H |
| $NO_2$ | H | H | H |
| H | H | $NO_2$ | H |
| H | $CH_3\overset{O}{\underset{\|}{C}}$— | H | H |
| H | $CH_2{=}CHCH_2$ | H | H |
| CN | H | H | H |
| $NO_2$ | H | $NO_2$ | H |
| H | $CH_3CH_2O$— | H | H |
| H | OH | H | H |

TABLE—Continued

| R₁ | R₂ | R₃ | R₄ |
|---|---|---|---|
| H | H | Ph | CH₃ |
| COOH | H | H | H |
| CONH₂ | H | H | H |
| H | SH | H | H |
| H | Ph | Ph-O— | Ph |
| H | (CH₃O)₃-Ph | H | CH₃ |
| H | Ph | Cl-Ph-O— | Ph |
| H | NO₂-Ph | H | H |
| Cl | Cl | Cl | Cl |
| H | Ph | CH₃-Ph-O— | Ph |

2. A compound of claim 1 having the name 2-oxo-1(2H)-pyridinecarbonitrile.

3. A process for preparing a compound of claim 1 comprising treating an alkali metal salt of 2(1H)-pyridone or a substituted derivative thereof with a cyanogen halide.

4. A process according to claim 3 wherein the cyanogen halide is cyanogen bromide.

5. A process according to claim 3 wherein the alkali metal salt is obtained by reacting a 2(1H)-pyridone with an alkali metal hydride, an alkali metal amide or an organo-alkali metal compound.

References Cited

UNITED STATES PATENTS

3,668,211　6/1972　Crabtree ———————— 260—294.9

OTHER REFERENCES

Roberts et al.: Basic Principles of Organic Chemistry, Benjamin Publishers, p. 806, 1965.

ALAN L. ROTMAN, Primary Examiner

U.S. Cl. X.R.

260—247.2 A, 283 CN, 287 R, 293.59, 293.69, 294.8 G, 294.9, 295.5 R, 295.5 AM, 297 Z; 71—88, 94; 424—248, 258, 263, 266, 267

PO-1050
(5/69)

UNITED STATES PATENT OFFICE
CERTIFICATE OF CORRECTION

Patent No. 3,769,291            Dated    October 30, 1973

Inventor(s)  William Lawrence Parker et al.

It is certified that error appears in the above-identified patent and that said Letters Patent are hereby corrected as shown below:

Column 4, line 34, "nitrile" should read --nitrite--.
Column 4, line 58, before "239.5" delete "sh".
Column 6, the formulas at the beginning of the table should read:

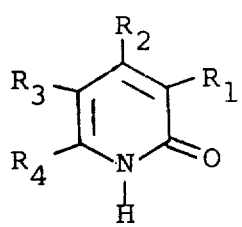 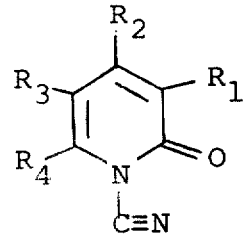

Column 6, example 32, column $R_3$, the formula should read

Column 8, in both of the formulas at the beginning of the table,

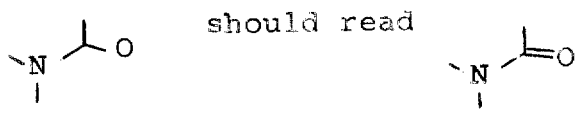

Column 10, claim 1, the formula should read 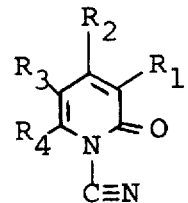

Signed and sealed this 23rd day of April 1974.

(SEAL)
Attest:

EDWARD M. FLETCHER, JR.
Attesting Officer

C. MARSHALL DANN
Commissioner of Patents